May 12, 1931.  E. GRAU  1,804,606
REGULATOR SYSTEM
Filed Nov. 7, 1927
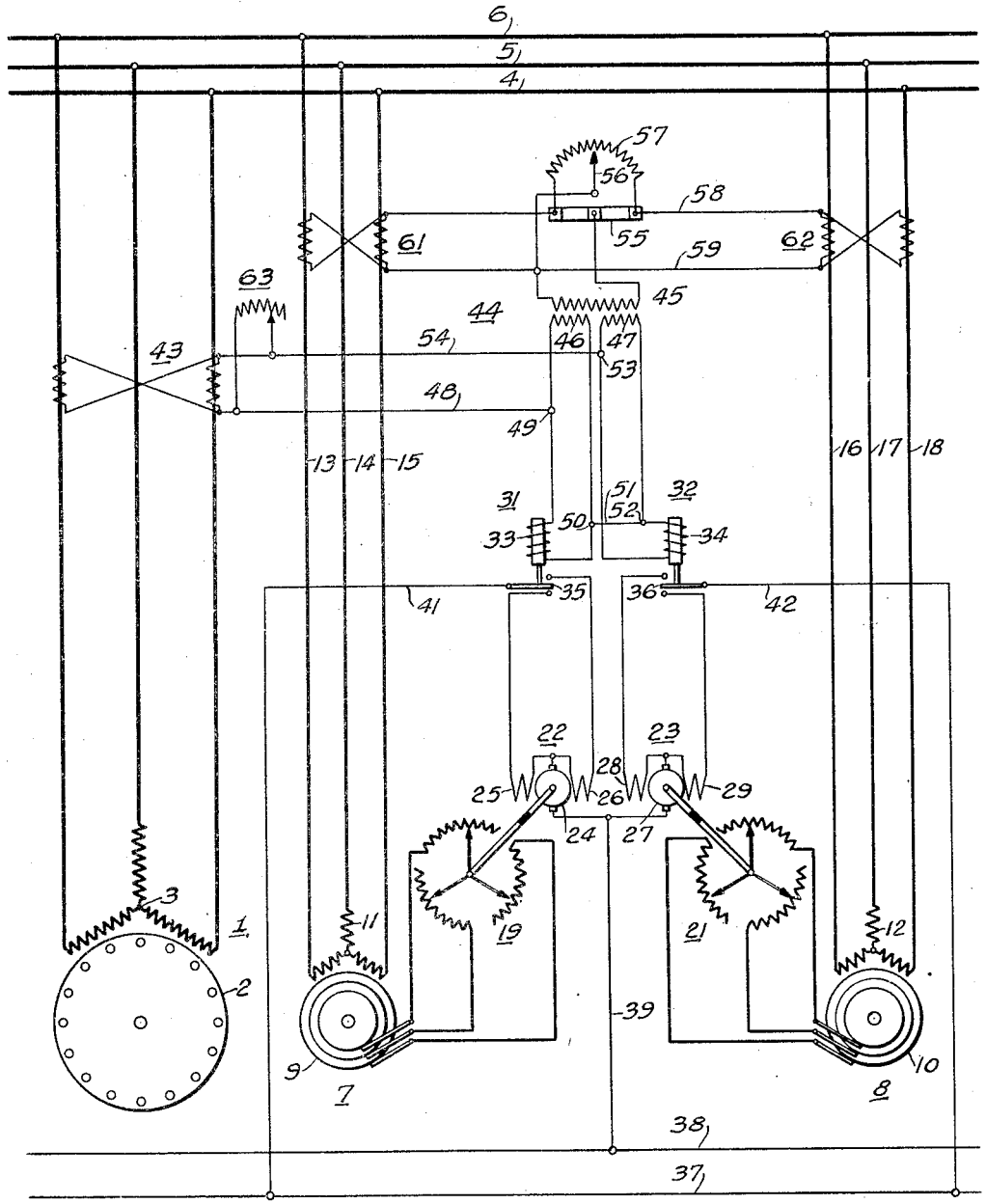
INVENTOR
Ernst Grau.
BY
Wesley G. Carr
ATTORNEY Patented May 12, 1931

1,804,606

UNITED STATES PATENT OFFICE

ERNST GRAU, OF BERLIN-CHARLOTTENBURG, GERMANY, ASSIGNOR TO WESTINGHOUSE ELECTRIC & MANUFACTURING COMPANY, A CORPORATION OF PENNSYLVANIA

REGULATOR SYSTEM

Application filed November 7, 1927, Serial No. 231,487, and in Germany November 11, 1926.

My invention relates to load-regulating systems and more particularly to regulating systems for maintaining a predetermined constant and balanced load on a plurality of work devices.

My invention has application in governing the feeding of material to a plurality of wood grinders or the like driven from a common motor. In grinders using a single grindstone driven by a motor, the load on the grinding motor is preferably kept approximately constant by regulating the pressure with which the wood is forced against the grindstone.

Where a grinding motor is used to drive a pair of grindstones, it is sufficient, so far as maintaining the load on the grinding motor constant is concerned, to regulate the total pressures at the grindstones for constant load. It often happens, however, that the distribution of the load at the individual grindstones varies. If, at one grindstone, a particularly high friction resistance develops, owing to the stone engaging a knot in the wood, while the other grindstone encounters cavities contained within the wood being fed to the stone, so that the grindstone is only in contact with small portions of the wood, the resistance is very small. This unbalance in load on the two grinding stones may cause the ground wood or pulp to show an undesirable degree of irregularity.

The present invention contemplates providing regulators for the individual feed motors that are affected simultaneously but oppositely by changes in the division of the load between the grinding wheels.

An object of my invention is, therefore, to provide a load-regulating system for a motor driving a plurality of work devices with which a plurality of feed motors are utilized to govern the load on the several devices, wherein the total load on the driving motor is kept substantially constant and the load ratio on the several feed motors is maintained at a predetermined value.

My invention will be better understood by reference to the accompanying drawing in which the single figure illustrates an embodiment of my invention.

Referring to the drawing, a driving motor 1 is illustrated which may drive a pair of grindstones and is provided with a rotor 2 and a stator winding 3 that is connected to the supply conductors 4, 5 and 6. Two feed motors 7 and 8 which control the feed of the wood to the grindstones in a well known manner are provided. The motors 7 and 8 are provided, respectively, with rotor windings 9 and 10 and with stator windings 11 and 12 that are connected, by conductors 13, 14 and 15 and 16, 17 and 18, to the supply conductors 4, 5 and 6. The rotor windings 9 and 10 are connected, respectively, to variable resistors or speed-controlling rheostats 19 and 21 that are operated by the pilot motors 22 and 23. The pilot motor 22 is provided with an armature winding 24 and differentially related field windings 25 and 26. The pilot motor 23 is provided with similar armature and field windings 27, 28 and 29.

Regulating relays 31 and 32 control the pilot motors 22 and 23, respectively, thus governing the load on the feed motors 7 and 8. The relays 31 and 32 comprise, respectively, electromagnet windings 33 and 34 and movable contact members 35 and 36 to be actuated thereby to close circuits through the armature windings and one of the field windings of the pilot motors to operate them in the one or the other direction. The motors 22 and 23 are energized from direct-current supply conductors 37, 38. The circuit through the motor 22 is completed through conductor 39, armature winding 24, one of the differentially related field windings 25 and 26, contact member 35 and conductor 41. The circuit of the motor 23 is completed through the conductor 39, armature winding 27, one of the differentially related field windings 28 and 29, contact member 36 and a conductor 42.

The windings of the relays 31 and 32 are energized from two sources of power, the transformer 43 and the transformer 44. The current transformer 43 is connected to be responsive to the load on the main driving motor 1. The transformer 44 is provided with two secondary windings 46 and 47 that are connected, respectively, to the relay windings 33 and 34, and with a common primary winding 45 that is connected between the conductors 58 and 59 through the mid point of a fixed resistor 55 and the conductor 59. A load adjusting circuit is provided between the conductors 58 and 59 through the contact arm 56 and a variable resistor 57.

The resistors 55 and 57 are connected in parallel-circuit relation to each other and in series with one of the two conductors 58 and 59 that are connected between current transformers 61 and 62 that are connected, respectively, to be responsive to the current of the said motors 7 and 8.

The operation of the system is as follows:

As the load upon the main or grinding motor 1 increases or decreases, the voltage produced by the current transformer 43 similarly increases and decreases and varies the energization of the relays 31 and 32. The circuit from the transformer 43 may be traced through conductor 48 to a point 49, through the relay winding 33 and the secondary transformer winding 46, connected in parallel-circuit relation, to the point 50, then through conductor 51 to the point 52, through the relay winding 34 and the secondary transformer winding 47, connected in parallel circuit relation, to the point 53, and through the conductor 54 back to the transformer 43.

A variable resistor 63 is provided, and connected across the circuit from the transformer 43, to adjust the current values corresponding to the neutral position of the relays 31 and 32 and thereby to adjust the load to be maintained on the motor 1.

If the load on the motor 1 is less than the desired value, the relays 31 and 32 will close a circuit through the pilot motors 22 and 23, respectively, operating the rheostats 19 and 21 in a direction to increase the loads on the feed motors 7 and 8. When the load on the driving motor has increased to the desired value, the relays 31 and 32 will be actuated to the illustrated position to deenergize the pilot motors 22 and 23. If the load on the driving motor 1 rises above the desired value, the relays 31 and 32 will be actuated in the opposite direction to decrease the speed of the feed motors 7 and 8 and thereby to decrease the load on the driving motor 1.

If the loads on the feed motors 7 and 8 vary together, there will be no current flowing through the conductors 58 and 59, since the transformers 61 and 62 are so connected as to oppose each other. If, however, the load ratio of the motors 7 and 8 varies, causing a current to flow through the primary winding 45 of the transformer 44, current will flow through the circuit of the transformer winding 46 and the relay winding 33, and through the circuit of the transformer winding 47 and the relay winding 34.

The transformer windings 46 and 47 are so connected to the relay windings 33 and 34, respectively, that, as current flows through the primary winding 45 of the transformer 44, the current produced thereby in the circuits of the relay windings causes the relays to be operated in opposite directions, so that one of the relays 31 and 32 will cause an increase in the load on its corresponding feed motor, and the other relay will cause a decrease in the load on the other feed motor. The desired load ratio between the two grindstones, corresponding to the two feed motors 7 and 8, is thereby maintained. In case it is further desirable to maintain the load on one of the feed motors, greater or less than that of the other feed motors, this may be done by varying the position of the contact arm 56, thus varying the current ratios of the transformers 61 and 62 corresponding to zero current through the transformer winding 45.

Many modifications may be made in the circuits and apparatus illustrated without departing from the spirit of my invention and I do not wish to be limited otherwise than by the scope of the appended claims.

I claim as my invention:

1. In an electric feed-control system, a plurality of work devices, a common driving motor for operating said work devices, separate motors for feeding the work to said several work devices, a regulator for each of said feed motors comprising a magnet winding, a circuit for each of said windings, means for energizing said windings in accordance with the load on said driving motor, and means for introducing voltages into the circuits of said windings which vary in accordance with variations in the load distribution on said feed motors.

2. In a feed-control system, two work devices, a common driving motor for operating said work devices, separate feed motors for feeding the work to said work devices, a regulator for each of said motors comprising a magnet winding, a circuit for each of said windings, means for energizing said windings in accordance with the load on said driving motor, and means for varying the energization of each of said windings in accordance with the difference in the loads between said feed motors.

3. In a feed-control system, a pair of work devices, a common driving motor for operating said work devices, separate feed motors for feeding the work to said work devices, a regulator for each of said feed motors, a circuit for actuating said regulators, two sources of energy for supplying said circuit, one of said sources being responsive to the load on the main motor and one of said sources being responsive to the difference in the loads between said feed motors.

4. In a feed-control system, a pair of work devices, a common driving motor for operating said work devices, separate feed motors for feeding the work to said work devices, a regulator for each of said feed motors comprising a magnet winding, a circuit for each of said windings, means for energizing said windings in accordance with the load on said driving motor, and means for simultaneously and oppositely varying the energization of said windings upon changes in the division of load between said work devices.

In testimony whereof, I have hereunto subscribed my name this 13th day of October, 1927, at Berlin-Siemensstadt, Germany.

ERNST GRAU.